Patented June 17, 1952

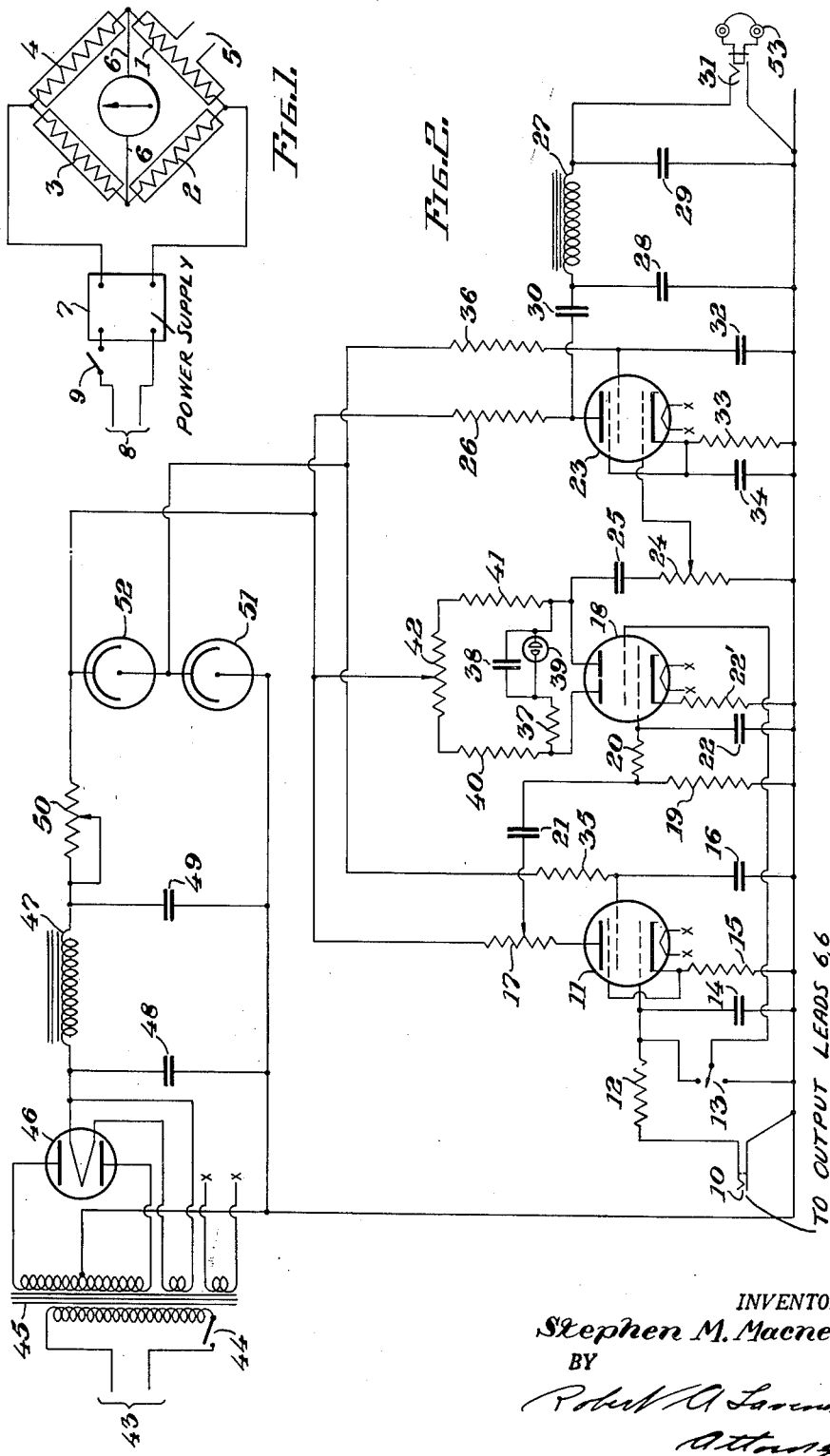

2,600,891

UNITED STATES PATENT OFFICE 2,600,891

VACUUM SYSTEM LEAK DETECTOR

Stephen M. MacNeille, Oak Ridge, Tenn., assignor, by mesne assignments, to the United States of America as represented by the United States Atomic Energy Commission Application September 20, 1946, Serial No. 698,333

7 Claims. (Cl. 177—311)

My invention relates to leak detectors and more particularly to leak detectors of the audible type for locating leaks in vacuum systems.

In searching for leaks in vacuum systems, it is the usual practice for an operator to subject suspected parts of the system to a stream of some gas differing markedly from air in some property utilized for measuring pressure, such as ionization or thermal conductivity. When the stream of gas, such as propane or the like, is played on a leak, the pressure reading will change, due to the entrance of the foreign gas into the system. This is brought about by the change in the ionization current of an ionization gauge, due to the change in the gas pressure in the vacuum system or difference in ionization probability of the foreign gas. Such change in current is thus noted on an electrical indicator. However, difficulty arises in noting a pressure change reading and correlating it exactly with the position of the leak.

In using leak detectors of this character it has been the practice for one operator to apply the gas to the suspected parts of the system to be tested, while the other operator watches the indicator or recorder for effects produced. In equipments of substantial size the recording or indicating apparatus may be located some distance away, so that it is necessary for the two operators to maintain communication through a telephone connection. This introduces a time delay with resulting inaccuracies, since the first operator may have moved on to other suspected parts before he receives a communication from the second operator as to the status of the indicator. This makes the operation confusing and inefficient and often requires a great deal more time and effort to locate the leaks.

Applicant with a knowledge of all of these defects in and objections to the systems and practices of the prior art has for an object of his invention the provision of an audible leak detector which may be quickly and efficiently operated by a single operator.

Applicant has as another object of his invention the provision of an audible leak detector which will give a sharp distinctive audible indication in the manner of a transitory squeal as soon as a leak is encountered so that it may be instantly and unmistakably located.

Applicant has as another object of his invention the provision of a vacuum leak detector the index of the output of which rises upon the detection of a leak and remains at the new level as long as gas is applied to the leak, thereby continuing to indicate the position of the leak.

Applicant has as another object of his invention the provision of an audible leak detector wherein the change in ionization current of an ionization gauge, due to the change in gas pressure in a vacuum system, produces a voltage change which in turn produces an audible signal.

Applicant has as a further object of his invention the provision of an audible leak detector for converting the voltage change, due to the change of gas pressure in a vacuum system, into a pulsating voltage of changing frequency and then into audible sound waves.

Applicant has as a further object of his invention the provision of an audible leak detector whose frequency is altered in response to the detection of a leak in a vacuum system.

Applicant has as a still further object of his invention the provision of an audible leak detector for vacuum systems which eliminates the undesirable and harsh higher frequencies and which produces a pleasant rhythm effect when in operation.

Other objects and advantages of my invention will appear from the following specification and accompanying drawings and the novel features thereof will be particularly pointed out in the annexed claims.

In the drawings, Figure 1 is a schematic of a suitable form of Pirani vacuum gauge to be used as a part of my improved leak detector. Figure 2 is a circuit diagram of one form of the circuit employed in my improved leak detector.

In leak detection the Pirani tube makes a very convenient pressure gauge for this purpose, since it provides a continuous flow of information. This gauge measures pressure indirectly and the operation of this hot wire gauge is based on the principle that the heat conductivity of a gas at low pressures, e. g. below 1000 microns, is proportional to its pressure. The gauge measures the resistance of a length of wire. The wire is inclosed in a tube attached to the vacuum system so that the wire is exposed to the same vacuum as is in the system. The wire is heated by an electric current flowing through it. Within a certain range, the temperature of the wire, and thus its resistance, depends upon the pressure of the gases surrounding the wire. When the pressure is decreased, relatively less heat escapes from the wire, its temperature rises with consequent increase in resistance, and the meter reads fewer microns of pressure.

A simplified arrangement of the Pirani tube is illustrated in Figure 1. It is desirable that the gauge be very sensitive to changes in pressure. In order to measure various slight changes in the resistance of the wire in the Pirani tube for slight changes in pressure, this length of wire is made one of the four resistances of a sensitive Wheatstone bridge. The gauge unit which is attached to the vacuum system, preferably contains all four resistances 1, 2, 3, 4. Resistances 2, 3 and 4 are preferably sealed in tubes, and wire resistance 1 is in a tube connected directly to the vacuum system, as indicated at 5. Resistances 2, 3 and 4 are at substantially constant pressure and uniform temperature. The resistance of element 1 changes in response to changes in pressure. Slight changes of resistance unbalances the Wheatstone bridge and are reflected in voltage changes at the output 6. Ordinarily they are recorded by a meter connected into the circuit at this point. Power is fed to the system at the juncture of resistances 3, 4 and 1, 2 by a conventional power supply 7 fed from line 8 and controlled by switch 9.

As hydro-carbons have a different thermal conductivity than air this gauge is affected when gas, such as propane is introduced in the area of the leak, as heretofore indicated.

The output 6 of the circuit of Figure 1 feeds into the input 10 of the circuit of Figure 2. The input feeds the control grid of pentode amplifier 11, preferably of the 6SH7 type, through resistance 12 and is connected to the cathode circuit of the tube and negative lead of the power supply. Bridging the grid cathode circuit of tube 11 are the stationary contacts of a single throw double pole switch 13. Also bridging the grid cathode circuit of amplifier 11 is a grid condenser 14, preferably of .25 mf. size. The amplifier 11 is biased by a resistor 15 of about 500 ohms size. Bridging the screen grid and cathode circuit of amplifier 11 is a condenser 16, preferably of about 4 mf. The plate of amplifier 11 is fed through the winding of potentiometer 17 from the positive side of the power supply and is preferably of about 50,000 ohms resistance.

The first triode of double triode tube 18, preferably of 6SC7 type, is capacitatively coupled to amplifier 11 through resistances 19 and 20 and condenser 21 to the moving contact of potentiometer 17. The resistances are preferably 500,000 ohms each and the condensers are preferably 1 mf. and .1 mf., respectively. The grid of the second triode of tube 18 is joined to the moving contact of switch 13. The cathode is connected to the negative of the voltage source through a cathode biasing resistor 22'. The anode of the second triode of tube 18 is coupled to an output amplifier 23 through a potentiometer 24 of preferably 100,000 ohms and a condenser 25 of preferably .01 mf. connected in series and across the anode-cathode circuit of a tube 18. The control grid of pentode 23 preferably of the 6SH7 type is fed from the moving contact of potentiometer 24.

The anode of tube 23 is connected through resistance 26 to the positive of the power source and feeds its output through a low pass filter made up of inductance 27 of the order of 10 mh. and condensers 28, 29 of the order of .001 mf. The filter is fed through blocking condenser 30 for removal of D. C. The low pass filter feeds into the output circuit 31 which is in turn connected to an audible indicator, such as a pair of head phones or loud speaker 53. Across the screen grid and negative of the power source is a condenser 32 of about 4 mf. In the cathode circuit is cathode biasing resistance 33 shunted by condenser 34. The former is of about 100,000 ohms size while the latter is of about 20 mf.

Power is supplied to the screen grids of tubes 11 and 23 through resistances 35 and 36 which are of the order of 15,000 ohms and 20,000 ohms respectively. The free ends of resistances 35, 36 are joined together and connected to a low voltage output of the power source, to be described more in detail hereinafter.

Bridging the anodes of double triode tube 18 is a relaxation oscillator which comprises a resistance 37 of preferably 1 megohm size and the condenser 38, of preferably .002 mf., connected in series. The condenser 38 is shunted by neon tube 39 which breaks down at some predetermined potential such as 60 volts. The plates of tube 18 and also the relaxation oscillator are fed from the power source through load resistances 40, 41, preferably of 50,000 ohms each. Connected across the free ends of the load resistances 40, 41 are the stationary contacts of potentiometer 42 while the moving contact of the potentiometer is connected to the higher positive lead of the power source. The setting of the movable contact of potentiometer 42 therefore controls the frequency of the relaxation oscillator and likewise controls the actions of the two triodes of tube 18.

As is characteristic of these forms of oscillators, condenser 38 charges up through resistance 37 until it reaches the threshold voltage of glow tube 39, whereupon the glow tube lights up and discharges condenser 38. The cycle is repeated over and over again producing an imperfect or modified saw tooth wave. The frequency of this oscillator is dependent on the constants of the circuit. However, for any given set of constants its frequency depends upon the potential difference across it, and varies with such potential difference.

Power is supplied to this circuit through a conventional power source. The power line is indicated at 43 connected through a switch 44 to the primary of a transformer 45. The transformer 45 has several secondary windings. One of these secondary windings has a center tap for providing the negative lead for connection to the negative lead of the power source. The end leads of this winding are connected to the plates of the usual double wave rectifier 46. The cathode of the rectifier is heated from a secondary winding of about 5 volts. The lead from the center tap and the lead from the cathode of the tube feed into the usual low pass filter comprised of inductance 47 of the order of 10 henries and condensers 48, 49 of the order of 8 mf. connected in a "$\pi$" arrangement the condensers forming the legs of the "$\pi$." This filter in turn feeds into variable resistance 50 and to plates of tubes 11, 23 and the moving contact of the potentiometer 42. Bridged across the filter output are voltage regulator tubes 51, 52, connected in series. The juncture of these tubes 51, 52 is connected to the screen grid circuits of tubes 11, 23 and supplies the power therefor. There is an additional secondary winding in transformer 45 which supplies heating current to the various cathode heaters of tubes 11, 18 and 23 but the connections thereto are conventional and have been omitted for the purpose of clarity.

In its operation, the application of gas to the leaks causes the resistance of element 1 to change as the gas enters the vacuum system. This unbalances the Wheatstone bridge and produces a voltage across the output 6 which is impressed across the input 10 of the circuit of Figure 2. If the single throw switch 13 is closed in the lower contact position and the signal voltage is positive the grid of the pre-amplifier tube 11 becomes more positive, increasing the conduction of the tube and making its plate more negative. This negative signal is applied to the coupling condenser 21 and to the grid of the first triode of tube 18 in the form of a pulse. This causes the grid of the first triode of tube 18 to grow more negative and the potential of the plate of that tube to rise as its operation is so limited. This increases the potential difference between the plates of the two triodes of tube 18 and across the relaxation oscillator and increases the frequency of the oscillator. The output of the oscillator is fed through the power amplifier 23 and low pass filter to the output 31. This is in the form of a pulse and produces a higher momentary change in the sound from the speaker or head phones in the output 31 of the circuit. The low pass filter takes out the higher undesirable frequencies and makes the note more pleasing. With the circuit as described above employing capacitative coupling through condenser 21 between tubes 11 and 18, a sudden change in pressure "reading" will impress a voltage change on the input of the circuit of Figure 2 and the output of that circuit will produce a transitory change in frequency which will be reproduced as a transitory squeal.

Now, if the switch 13 be shifted to the upper contact position, the input signal will be impressed upon the grid of the second triode of tube 18. Assuming a positive signal as indicated above, the effect will be to increase the conductance of the second triode of tube 18. As the second triode of tube 18 conducts more, the anode of the tube becomes less positive and more negative. This further increases the potential difference across the relaxation oscillator, since, in response to the same signal the first triode of tube 18 conducts less, as previously described. This greater potential difference across the relaxation oscillator accentuates the transient signal by increasing the frequency of the oscillator. In this latter arrangement, there is a further difference in operation. The second triode of tube 18 is directly coupled as distinguished from capacitatively coupled to the input 10 of the circuit so that in addition to the transient squeal the frequency of the oscillator is maintained at a higher level than before so as to produce a new steady state indicating approximately the absolute pressure reading. This is due to the fact that once the signal is applied to the grid of the second triode it continues to conduct at the increased rate as long as the signal continues. In effect, the second triode responds to the signal level rather than solely to changes in signal level as is the case with the first triode.

It will be noted that separate power sources or supplies have been shown for the circuits of Figures 1 and 2. If desired, a single power source or supply may be used for this purpose instead of the two shown here. Although the foregoing circuit has been described in connection with a pressure gage, it is even more common to use it with an ion gage instead, so that the invention is not limited to the use of this circuit with any particular type of gage.

It will also be understood from the foregoing that double triode tube 18 acts with resistances 40, 41 and 42 to provide a resistance bridge circuit wherein the tube 18 comprises at least one of the legs of the bridge.

Having thus described my invention, I claim:

1. In a vacuum leak detector system, means to produce a voltage change in accordance with an ionization change, a resistance bridge circuit having for at least one of its legs a vacuum tube, means to apply said voltage change to the control electrode of said vacuum tube to thereby alter the resistance of the tube in accordance with the voltage change, means connected across the output of said bridge circuit to translate the unbalanced bridge voltage into pulsating voltage of audio-frequency, and means for rendering audible said pulsating voltage.

2. In a vacuum leak detector system, means to produce a voltage change in accordance with an ionization change, a resistance bridge circuit having for at least one of its legs a vacuum tube, means to apply said voltage change to the control electrode of said vacuum tube to thereby alter the resistance of the tube in accordance with the voltage change, interrupter means connected across the output of said bridge circuit to translate the unbalanced bridge voltage into pulsating voltage of audio-frequency, and means for rendering audible said pulsating voltage.

3. A leak detector of the character described in which a foreign gas through a leak causes a voltage change in a gage, means including an electric discharge device for translating said voltage change into a transitory frequency change, a circuit for translating said voltage change into a different frequency of steady state, and means for converting the transitory frequency change and the frequency of steady state into audible sound waves.

4. A leak detector of the character described in which a foreign gas through a leak causes a voltage change in a gage, a balanced circuit fed by the gauge, an oscillator, means including an electric discharge device coupled directly to said circuit and responsive to said voltage change for changing the frequency of the oscillator to a new steady state, and means for converting the frequency changes into audible signals.

5. A leak detector of the character described in which a foreign gas through a leak causes a voltage change in a gage, an oscillator, a circuit including an electric discharge device coupled to the oscillator and responsive to said voltage change for producing a transitory frequency change of the oscillator, and means for converting the transitory frequency change into an audible signal.

6. A leak detector of the character described in which a foreign gas through a leak causes a voltage change in a gage, an oscillator, means including an electric discharge device responsive to said voltage change for producing a transitory change in frequency of said oscillator, additional means including an electric discharge device responsive to said voltage change for changing the frequency of the oscillator to a new steady state, and means for translating the output of said oscillator into audible sound waves.

7. A leak detector for vacuum systems comprising means for producing voltage changes in accordance with pressure changes, a resistance bridge having for at least two of its legs electric discharge devices, means for coupling one of said discharge devices to said voltage change producing means for translating said voltage changes into transitory frequency changes, means for directly coupling a second of said discharge devices to said voltage change producing means for translating said voltage changes into different frequencies of steady state, said bridge having means bridged across its output for converting voltage changes into frequency changes, and an audible indicator fed by the bridge for rendering audible the changes in frequency.

STEPHEN M. MacNEILLE.

REFERENCES CITED

The following references are of record in the file of this patent:

UNITED STATES PATENTS

| Number | Name | Date |
|---|---|---|
| 1,599,483 | Parker | Sept. 14, 1916 |
| 1,744,935 | Van Der Pol | Jan. 28, 1930 |
| 2,004,662 | Junkers et al. | June 11, 1935 |
| 2,395,368 | Bull | Feb. 19, 1946 |
| 2,523,017 | Harrison | Sept. 19, 1950 |

OTHER REFERENCES

Electronics, pages 138–141, Feb. 1946.